US009836734B2

United States Patent
Argue et al.

(10) Patent No.: US 9,836,734 B2
(45) Date of Patent: Dec. 5, 2017

(54) PROVIDING ELECTRONIC RECEIPTS FOR VENDING MACHINE TRANSACTIONS

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/718,954

(22) Filed: Dec. 18, 2012

(65) Prior Publication Data

US 2014/0166749 A1  Jun. 19, 2014

(51) Int. Cl.
G06Q 20/32 (2012.01)
G06Q 20/04 (2012.01)
G07F 9/02 (2006.01)

(52) U.S. Cl.
CPC ....... *G06Q 20/322* (2013.01); *G06Q 20/0453* (2013.01); *G06Q 20/32* (2013.01); *G06Q 20/3276* (2013.01); *G07F 9/023* (2013.01)

(58) Field of Classification Search
CPC ............ G06F 19/3406; G06F 19/3481; G06Q 30/0271; G06Q 20/322; G06Q 20/0453; G06Q 20/3276; G06Q 10/00; G06Q 20/32; H04M 1/2755; H04M 1/72544; G07F 9/023
See application file for complete search history.

(56) References Cited

U.S. PATENT DOCUMENTS

| | | | |
|---|---|---|---|
| 5,396,443 A * | 3/1995 | Mese et al. | 713/321 |
| 6,321,985 B1 | 11/2001 | Kolls | |
| 6,487,540 B1 | 11/2002 | Smith | |
| 6,584,309 B1 | 6/2003 | Whigham | |
| 7,031,804 B2 | 4/2006 | Brooke, Jr. | |
| 7,072,854 B2 | 7/2006 | Loeser | |
| 7,110,954 B2 | 9/2006 | Yung | |
| 8,439,257 B2 * | 5/2013 | Beals | H04N 21/4316 235/435 |

(Continued)

FOREIGN PATENT DOCUMENTS

DE  19961793 C1  1/2001
EP  1343123 A1  9/2003

(Continued)

*Primary Examiner* — Sonji Johnson
(74) *Attorney, Agent, or Firm* — Bryan Cave LLP (57) ABSTRACT

Systems and methods are disclosed herein for providing an electronic receipt for a vending machine transaction. Upon conclusion of a vending machine transaction a screen on the vending machine displays an optically encoded electronic receipt. The optically encoded electronic receipt may encode a transaction identifier and may additionally encode details of the transaction. The vending machine may also transmit transaction data to a server. A user computing device may scan the optically encoded electronic receipt and retrieve a transaction identifier. Using the transaction identifier, the user computing device may request transaction data from the server either directly or by way of a server owned or controlled by a different entity. Additional content, such as advertisements may be transmitted with or for display with transaction data.

15 Claims, 7 Drawing Sheets

(56) References Cited

U.S. PATENT DOCUMENTS

| | | |
|---|---|---|
| 2001/0034566 A1 | 10/2001 | Offer |
| 2006/0122881 A1* | 6/2006 | Walker ................ G06Q 10/087 705/14.13 |
| 2008/0214310 A1* | 9/2008 | Brunet De Courssou et al. .............................. 463/42 |
| 2009/0306819 A1 | 12/2009 | Insolia |
| 2011/0016007 A1 | 1/2011 | Shiftan |
| 2011/0264586 A1* | 10/2011 | Boone .................... G06Q 20/20 705/67 |
| 2012/0005076 A1 | 1/2012 | Dessert |
| 2012/0045059 A1* | 2/2012 | Fujinami ............... H04L 9/0866 380/273 |
| 2012/0124365 A1* | 5/2012 | Black ........................ G07F 7/00 713/150 |
| 2012/0187187 A1* | 7/2012 | Duff et al. .................... 235/382 |
| 2013/0032634 A1* | 2/2013 | McKirdy ..................... 235/375 |
| 2013/0035787 A1* | 2/2013 | Canter .......................... 700/232 |
| 2013/0124411 A1* | 5/2013 | Kobres et al. ................. 705/43 |
| 2013/0211900 A1 | 8/2013 | Dessert |
| 2014/0032347 A1* | 1/2014 | Argue et al. ................... 705/21 |

FOREIGN PATENT DOCUMENTS

| | | |
|---|---|---|
| WO | WO0280121 A2 | 10/2002 |
| WO | WO03077211 | 9/2003 |
| WO | WO2008083025 A2 | 7/2008 |

\* cited by examiner

PROVIDING ELECTRONIC RECEIPTS FOR VENDING MACHINE TRANSACTIONS

FIELD OF THE INVENTION

This invention relates to conducting transactions using a vending machine.

BACKGROUND OF THE INVENTION

The types of products that can be bought from automated vending machines have increased considerably. The cost and complexity of items that can be bought has also increased significantly. For example, accessories to electronic devices and expensive electronic devices themselves can now be purchased from vending machines. Although a simple purchase of a snack from a vending machine requires no documentation, such as a receipt. A purchaser of an expensive item may wish to document the transaction in case a return is needed or to obtain reimbursement from an employer, for example. Furthermore, it may be more important for a customer to include the cost of an expensive item in a record of expenses for budgeting purposes.

In view of the foregoing, it would be an advancement in the art to provided improved methods and systems for providing receipts for vending machine transactions.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
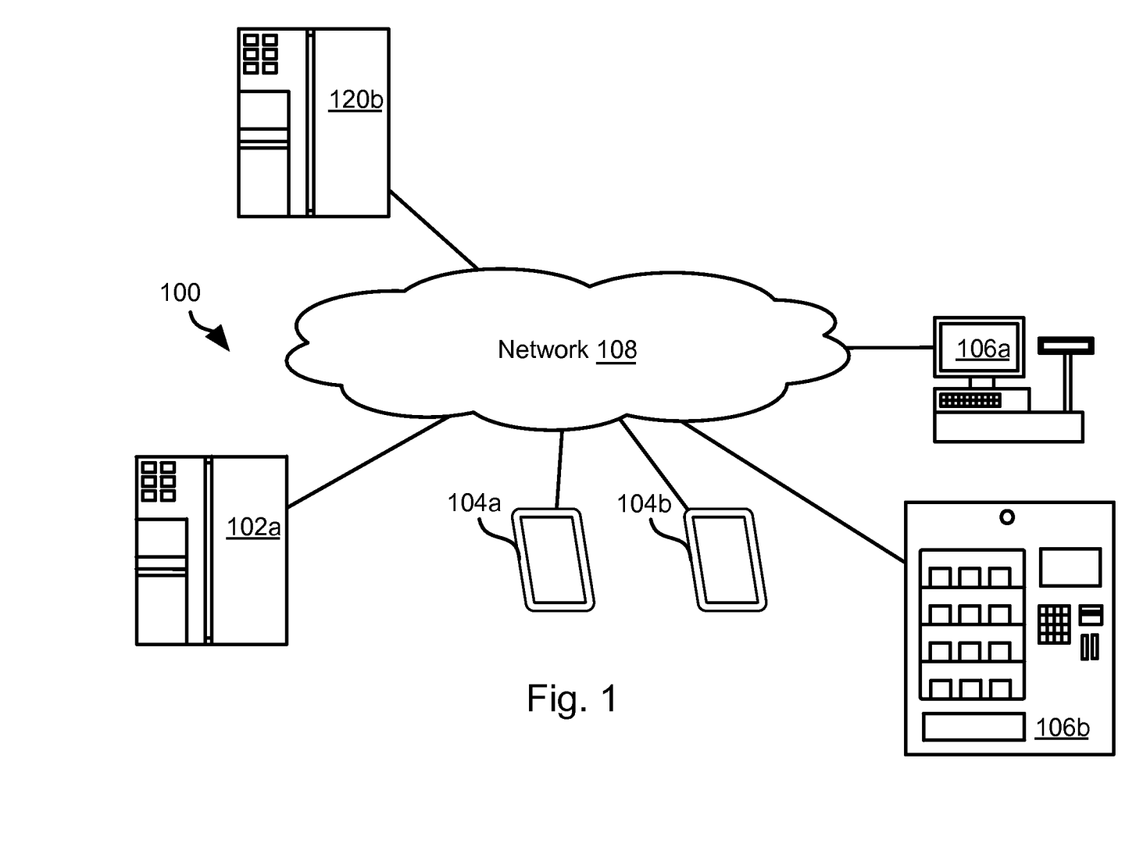
FIG. 1 is a schematic block diagram of a system for performing methods in accordance with embodiments of the invention.

FIG. 1 illustrates a system 100 in which methods described hereinbelow may be implemented. The system 100 may include one or more server systems 102a, 102b that may be embodied as one or more server computers each including one or more processors that are in data communication with one another. The server system 102a, 102b may be in data communication with one or more user computers 104a, 104b and one or more point of sale (POS) devices 106a, 106b. In the methods disclosed herein, the user computers 104a, 104b are advantageously mobile devices such as a mobile phone or tablet computer. As known in the art, many mobile phones and tablet computers also include cameras that can be used to scan optical codes such as barcodes, a two dimensional bar code (e.g. quick response (QR) codes), or textual information. In some embodiments, some or all of the methods disclosed herein may be performed using a desktop computer or any other computing device as the user computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity.

A POS 106a may be located within a store and may be part of a POS network. For example, a POS 106a may include an electronic cash register. In some embodiments, a POS 106a may be operable to process online transactions. In some embodiments, separate computers of the server system 102a may handle communication with the user computers 104a, 104b and POS 106a. A POS 106b may be embodied as an automated vending machine and may be located in a store or any other location where power is available.

Some or all of the server systems 102a, 102b, user devices 104a, 104b, and POS 106a, 106b may communicate with one another by means of a network 108. The network 108 may be embodied as a peer-to-peer wireless connection between devices, a connection through a local area network (LAN), WiFi network, the Internet, or any other communication medium or system.

The server system 102a may be associated with a merchant, or other entity, providing one or both of electronic receipt archiving and purchase activity-monitoring services. In some embodiments, the same entity that operates a POS 106a within a store may also own or control a POS 106b embodied as a vending machine. In other embodiments, the POS 106b is managed by a different entity and interaction with the POS 106b is handled by a server system 102b that is owned or controlled by a different entity than the server system 102a.

Figure 2:
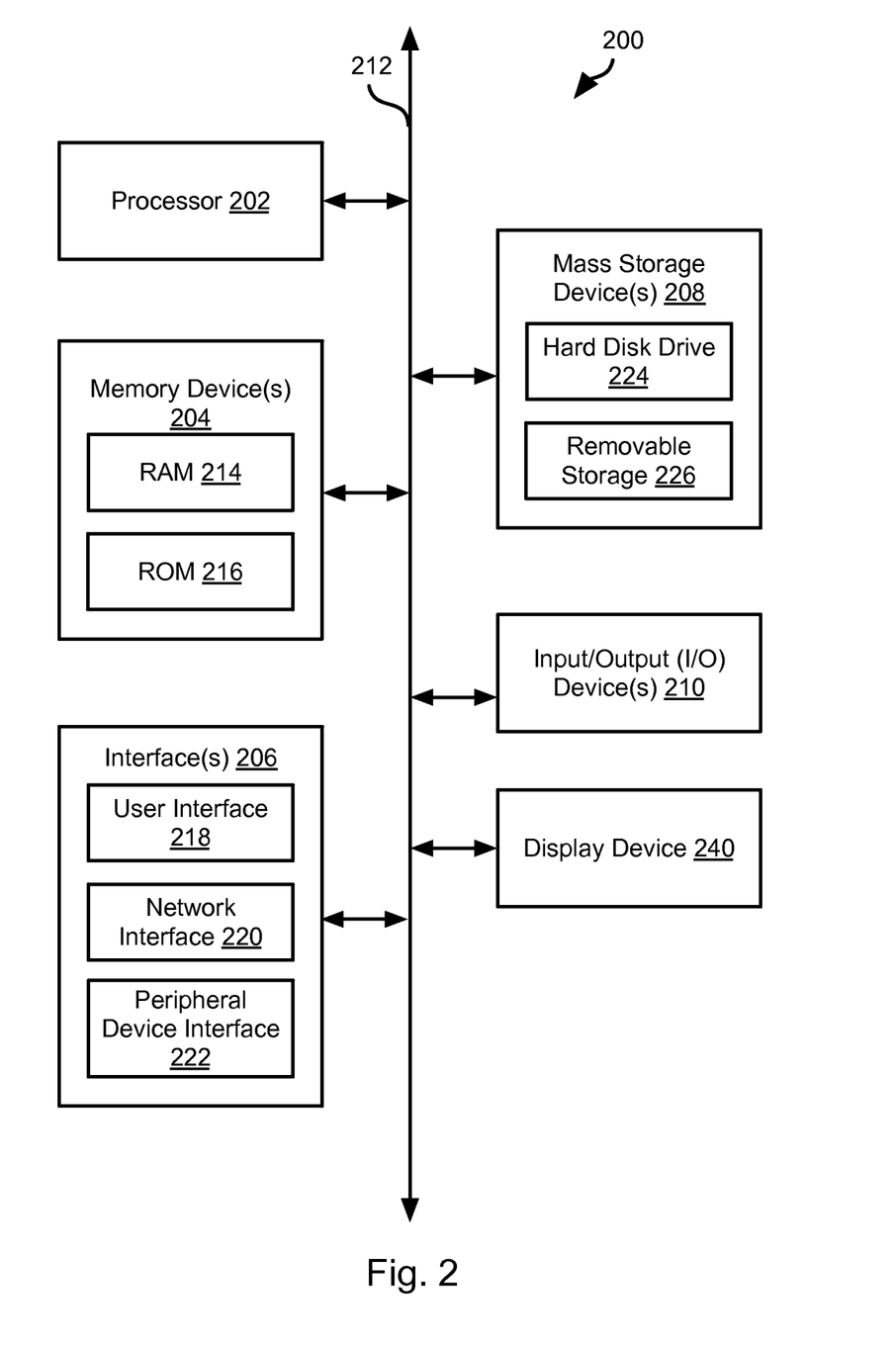
FIG. 2 is a block diagram of a computing device suitable for implementing embodiments of the invention.

FIG. 2 is a block diagram illustrating an example computing device 200. Computing device 200 may be used to perform various procedures, such as those discussed herein. A server system 102, user computer 104a, 104b, and POS 106a, 106b may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
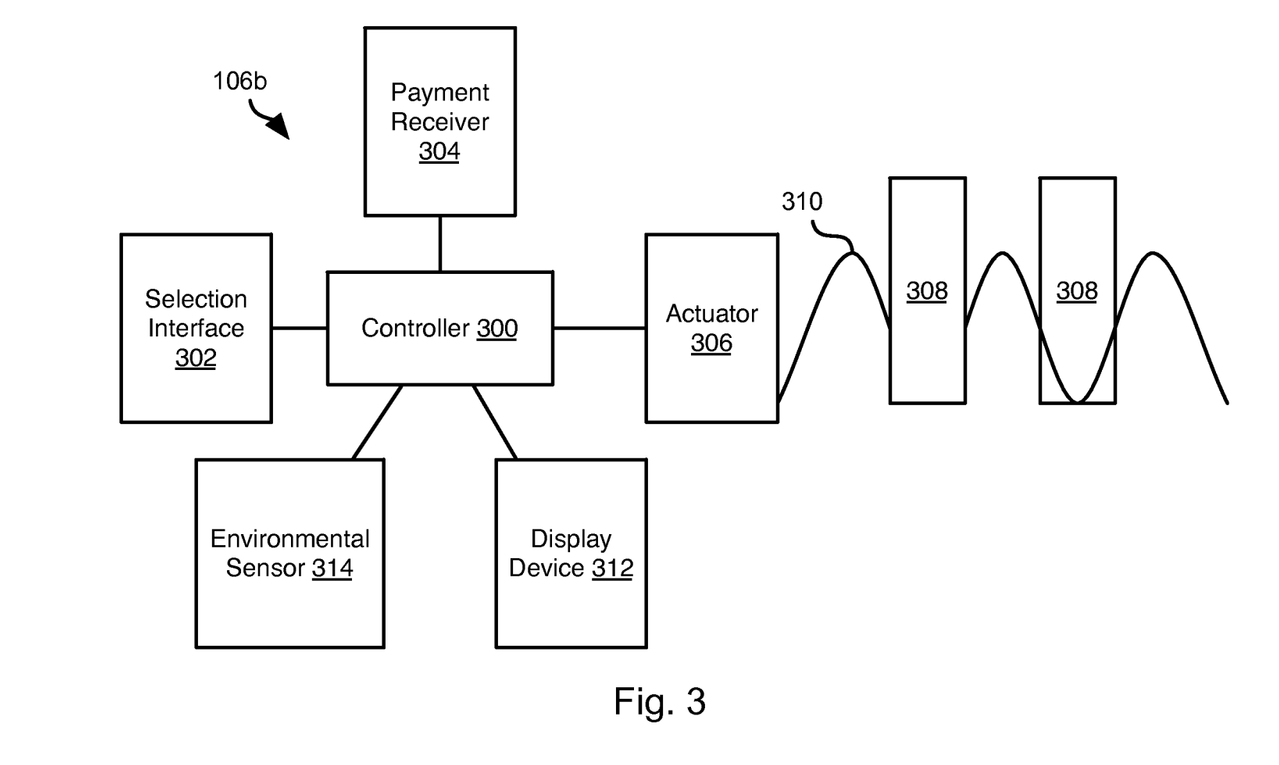
FIG. 3 is a schematic block diagram of a vending machine.

FIG. 3 illustrates a schematic block diagram of a POS 106b embodied as a vending machine. In particular, the POS 106b may be embodied as a POS 106b suitable for selling high end items and for performing functionality described herein. The POS 106b may include a controller 300. A controller 300 may include sufficient logical and computing capacity to perform methods as described herein. The controller 300 may include some or all of the attributes of a computing device 200. The POS 106b may include a selection interface 302 for receiving a customer selection and communicating the selection to the controller 300. The selection interface 302 may be embodied as buttons positioned adjacent a receptacle storing a particular item, a key pad, touch screen, or any other interactive element suitable for receiving a user selection as known in the art of vending machines and computing devices.

The controller 300 may be operably coupled to a payment receiver 304. A payment receiver 304 may include one or more devices capable of receiving tender of one or more of cash, coins, credit cards, or other payment method. The payment receiver 304 may further include a device for receiving payment information wirelessly or optically as known in the art. The payment receiver 304 may receive actual payment in the form of coins or bills and transmit notification of an amount received to the controller. Alternatively or additionally, the payment receiver 304 may receive input of payment information and submit such information to the controller 300 for actual processing of payment.

The controller 300 may also be operably coupled to an actuator 306 that includes a motor or some other transducer for dispensing or otherwise providing a purchasing customer access to a purchased item. For example, the actuator 306 may unlock a door or hatch opposite of which is a purchase product. The actuator 306 may also urge a purchased product outward from a vending machine POS 106b. For example, as is common in many vending machines, the actuator 306 may revolve a spiral 310 having products 308 positioned in the coils thereof, such that products are urged one at a time outwardly. Any actuator 306 and dispensing apparatus known in the art of vending machines may be used in accordance with methods described herein.

In some embodiments, a vending machine may sell intangible assets that are represented electronically, e.g. electronic tickets, electronic gift carts, music, videos, or the like. In such embodiments, the actuator 306 may be omitted. In such embodiments, purchase of a product may instead invoke transmission of electronic assets or data enabling access of electronic assets to a user computing device 104a, 104b or otherwise associating such data with an account associated with a purchasing user.

The controller 300 may also be operably coupled to a display device 312. The display device 312 may be embodied as a screen, light emitting diode array, digital read out, or the like. The display device 312 may be embodied as touch screen such that the selection interface 302 and display device 312 are embodied in the same device. The display device 312 may include a printer operable to print out symbolic information.

The controller 300 may also be operably coupled to one or more environmental sensors 314. The sensors 314 may include any sensor capable of detecting an environment of a POS 106b, such as a camera, thermal sensor, microphone, motion sensor, or the like. The sensor 314 may be positioned and oriented effective to detect a user standing in front of the POS 106b when purchasing an item.

Figure 4A:
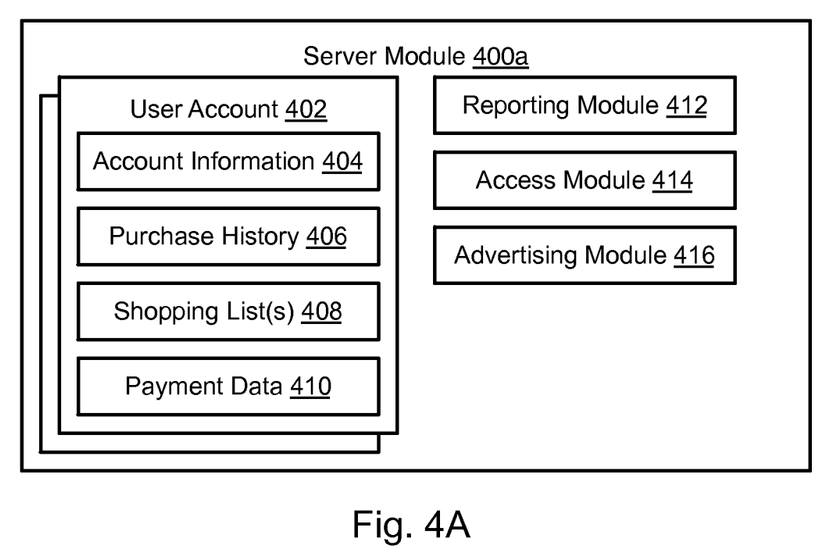
FIG. 4A is schematic block diagram of a server module in accordance with an embodiment of the invention.

Referring to FIG. 4A, a server system 102a, 102b may host or access a server module 400a. A server module 400a may host or access user accounts 402. The user accounts 402 may store or be associated with transaction data and other information for a user. For example, the user account 402 may include account information such as a username, password, demographic information (age, gender, etc.), gathered taste and preference data, and the like.

The user account 402 may additionally include a purchase history 406. The purchase history 406 may include one or more of online transactions, transactions conducted at a POS 106a and reported to the server system 102a, and transactions conducted at a vending machine POS 106b and reported to the server system 102a. The records of transactions in the purchase history 406 may include information such as a purchased product, purchase price, payment method, POS identifier and/or location, and the like. Where a transaction is reported by a vending machine POS 106b, the transaction record may additionally include one or more of an identifier of the vending entity, a location of the vending machine.

The user account 402 may store any other data that may be generated or used by a user when interacting with a merchant. For example, shopping lists 408, payment data 410, or other information. Where a merchant provides one or more websites or applications, the user account 402 may include data relating to these interfaces.

The server module 400a may include or access a reporting module 412. The reporting module 412 may receive transaction data as reported by any of a POS 106a, a POS 106b, a user computing device 104a, 104b, and a server system 102b owned or operated by different entity. The reporting module 412 may receive such information due to unsolicited notification or may solicit transaction data in accordance with methods described herein.

The server module 400a may include an access module 414. The access module 414 may enable access to a user account 402. The access module 414 may implement a web server that may be accessed by means of a browser executing on a user computing device 104a, 104b. Alternatively, the access module 414 may provide access to transaction data by interfacing with a dedicated merchant application executing on a user computing device 104a, 104b. The access module 414 may perform such functions as authenticating a user, establishing network connections, receiving requests for data from the user computing device 104a, 104b and forwarding responses to requests to the user computing device.

The server module 400a may include an advertising module 416. The advertising module 416 may select advertisements for display along with requested transaction data. For example, where transaction data is requested with respect to a particular product, advertisements may be selected that relate to one or more of that product, the manufacturer of the product, a product category of the product, the demographic of the requesting user, the transaction history of the requesting user, a taste profile of the user, or the like. In instances where transaction data is requested for a transaction conducted at a POS 106b operated by a different entity than a merchant hosting the server module 400a, the advertising module 416 may selected advertisements relating to that entity, request advertisements from that entity for insertion, or otherwise select advertisements that promote that entity and its products.

Figure 4B:
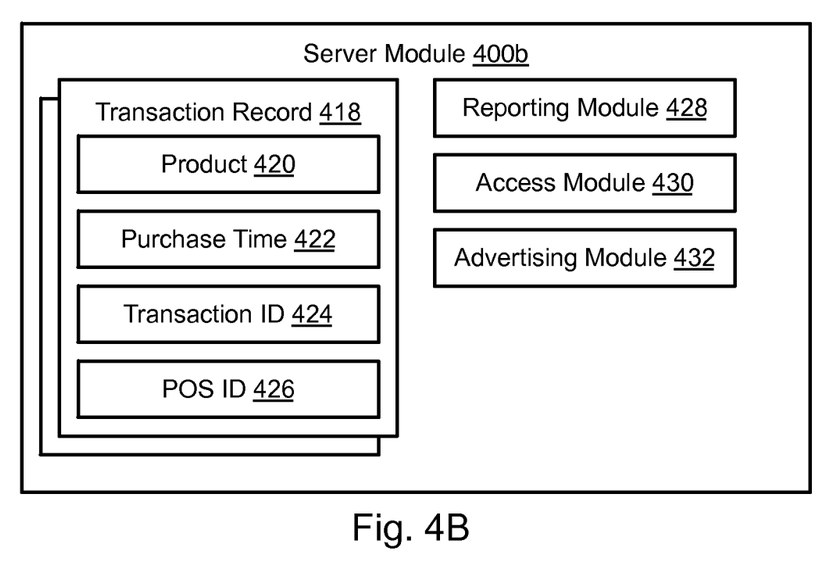
FIG. 4B is schematic block diagram of an alternative embodiment of a server module in accordance with an embodiment of the invention.

Referring to FIG. 4B, in some embodiments, a server system, such as a server system 102b for an entity operating vending machine POSs 106b, may host a server module 400b that one or both of does not obtain user identifying information or does not record or store such information. For example, at a vending machine transaction where cash is used, no user information may be obtained for association with the transaction. In such embodiments, a server module 400b may store or access transaction records 418 as received from a vending machine POS 106b. For example a transaction record 418 may include such information as an identifier 420 of a product, a purchase time 422, a unique transaction identifier 424, and an identifier 426 of the POS 106b where the transaction occurred. In some embodiments, the transaction identifier 424 may be globally unique, either with respect to all transactions conducted by the entity owning or controlling the vending machine POS 106b or for all transactions by all entities participating in a transaction numbering system.

The server module 400b may include one or more of a reporting module 428, access module 430, and advertising module 432 that operate in a similar manner to corresponding modules of the server module 400a. In particular, the access module 430 may response to requests by the server module 400a in accordance to methods described herein. Likewise, the advertising module 432 may provide advertisements to the server module 400a for display with transaction data as discussed above with respect to the advertising module 416. The advertising module 432 may provide advertisements periodically for subsequent usage or may respond with advertisements on-demand for a specific request to view transaction data.

Figure 5:
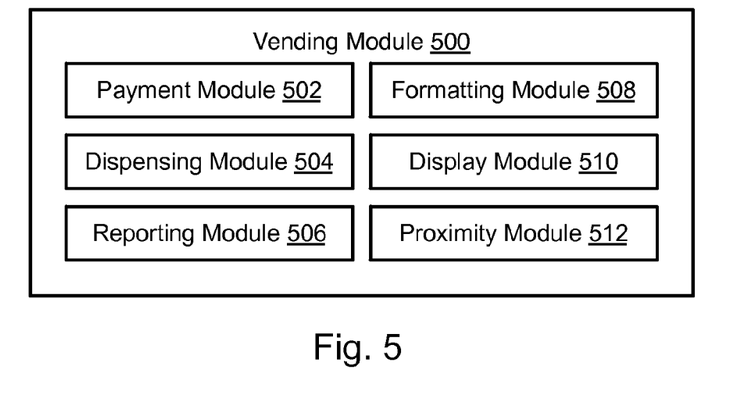
FIG. 5 is schematic block diagram of a vending module in accordance with an embodiment of the invention.

FIG. 5 illustrates a vending module 500 that may be hosted or accessed by a controller 300 of a vending machine POS 106b. The vending module 500 may include a payment module 502. The payment module 502 may receive payment information from a payment receiver 304, such as in the form a credit card number or other electronic account number communicated to the payment receiver 304 by means of a magnetic strip, optical code, wireless transmission or the like. The payment module 502 may further be operable to interface with a payment processing entity in order to transfer a purchase price amount from the received electronic account to the owner or operator of the vending machine POS 106b. The payment module 502 may product an output indicating that payment has received, or that payment was not successfully received.

A dispensing module 504 receives the output from the payment module indicating that payment was received and, in response, actuates the POS 106b effective to dispense, or allow access, to a product selected by a customer. A reporting module 506 is operable to communicate data describing a transaction to a server system 102a, 102b. The information reported may include some or all of the transaction data 418 described with respect to FIG. 4B.

The vending module 500 may include a formatting module 508 that is operable to encode data in an optical code displayed on the display device 312 of the vending machine POS 106b. The optical code may be a bar code, two dimensional bar code (e.g., quick response (QR) code) or other optical encoding of information. The information may be a transaction identifier, or an identifier that can be mapped to the transaction identifier for a transaction. The optical code may also encode some or all of the other items of transaction data 418 for a transaction. In some embodiments, the optical code may encode a URL that, when accessed, retrieves a web page including transaction data 418 for the transaction. The display module 510 may present the optical code upon conclusion of a transaction for which the optical code encodes information. The display module 510 may invoke display of the optical code on the display device 312 of the vending machine POS 106b.

The proximity module 512 may be operable to detect one or both of arrival, presence, and departure of a customer proximate the vending machine POS 106b. The proximity module 512 may take as an input of one or more environmental sensors 314. For example, where the environmental sensor is a camera, the proximity module may detect proximity of a customer based on the presence of the customer in an image output by the camera. Where the environmental sensor 314 is a microphone, proximity may be detected by detecting audible behaviors such as breathing and movement. Where the environmental sensor 314 is a thermal sensor, then the output of the thermal sensor may be used to detect warmth from a customer or the absence of thereof to detect proximity. In some embodiments, a proximity module 512 may use outputs from multiple environmental sensors in order to determine whether a customer is proximate the vending machine POS 106b.

Figure 6:
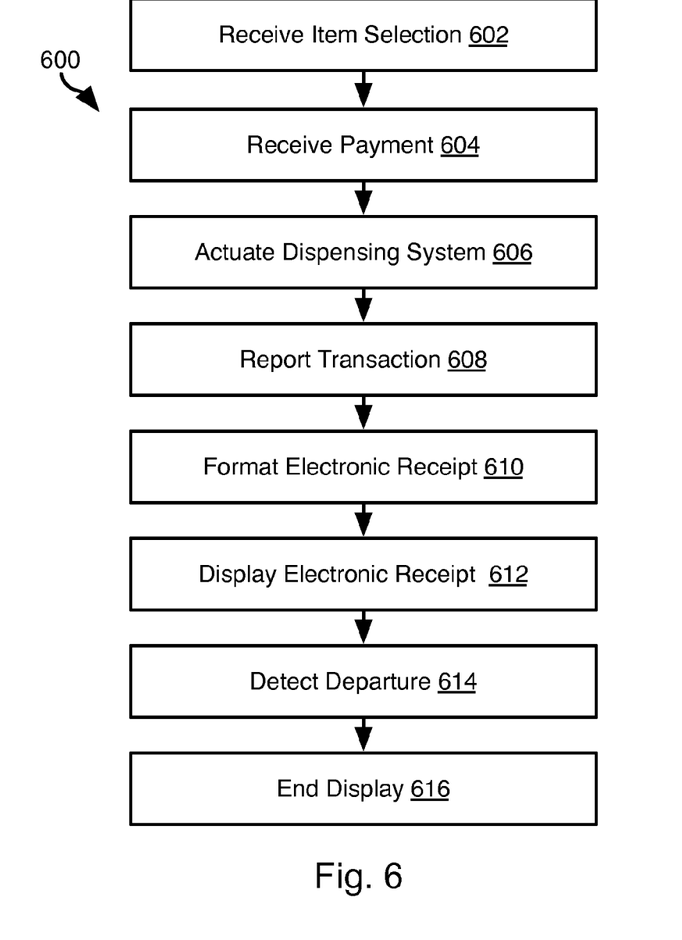
FIG. 6 is a process flow diagram of a method for generating an electronic receipt by a vending machine in accordance with an embodiment of the invention.

FIG. 6 illustrates an example of a method 600 that might be executed by a vending machine POS 106b. The method 600 may include receiving 602 an item selection and receiving 604 payment. An actuator 306 may then be actuated 606 in order to dispense or allow access to the selected item. The transaction may be reported 608, such as to a server system 102b, or a server system 102a. In some embodiments, only an optical code is used to retrieve transaction information and reporting 608 by the vending machine POS 106b may be omitted. As already noted, a vending machine POS 106b may be operated by a separate entity than the entity operating an in-store POS 106a. Accordingly, reporting 608 may include reporting the transaction to a server system 102b operated by an entity that operates the vending machine POS 106*b* with the transaction being subsequently reported to a server system 102*a* for a merchant according to methods described herein.

The method 600 may include formatting 610 an electronic receipt. Formatting 610 an electronic receipt may include generating an optical code adhering to a protocol in order to encode one or more details of a transaction. For example, transaction data may be encoded as a bar code, two dimensional bar code (e.g., a quick response (QR) code), or some other optical code. Formatting 610 the electronic receipt may include encoding an identifier that may be used to access actual transaction data or may include encoding some or all of the transaction data. Formatting 610 the electronic receipt may include encoding a uniform resource locator (URL) that, when accessed, can be used to retrieve reported 608 transaction data.

The formatted 610 electronic receipt may then be displayed 612 on a display device 312 of the vending machine POS 106*b*. For example, the optical code may be displayed on a screen. Displaying 612 the electronic receipt may include displaying additional information such as one or more details of a transaction. Displaying 612 the electronic receipt may include displaying a text prompt to a user to take a picture of the electronic receipt. An audible prompt to take a picture may additionally or alternatively be displayed.

The method 600 may include detecting 614 departure of a customer following conclusion of a transaction. Detecting 614 departure may include detecting movement of the customer away from a the vending machine POS 106*b* in images captured by a camera mounted to the vending machine POS 106*b*. Detecting 614 departure may include detecting the absence of thermal radiation using a thermal sensor, detecting, detecting a lack of motion adjacent the vending machine POS 106*b* using a motion sensor, or any other means for detecting presence or absence of a customer. Upon detecting 614 departure, display of the electronic receipt may be ended 616 to prevent capture of the electronic receipt by another. In some embodiments, the electronic receipt may be displayed for a fixed time after conclusion of a transaction and then removed without regard to any measure of proximity. In some embodiments, the electronic receipt may be displayed until one of a time period from conclusion of the transaction has elapsed and departure is detected.

Figure 7:
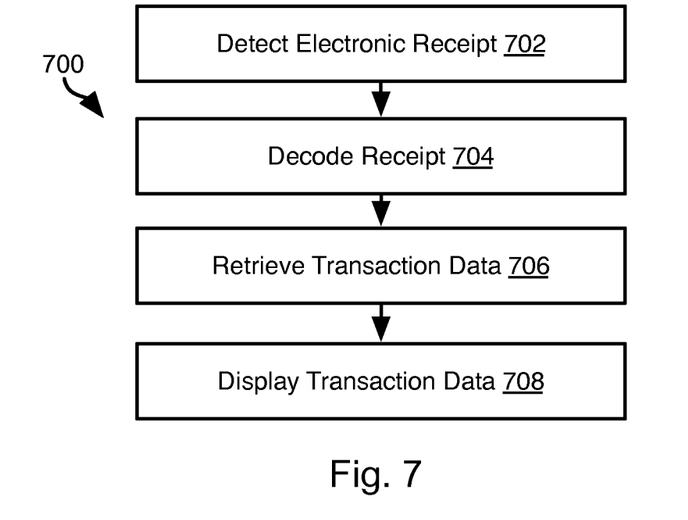
FIG. 7 is a process flow diagram of a accessing an electronic receipt generated by a vending machine in accordance with an embodiment of the invention.

FIG. 7 illustrates a method 700 that may be executed on a user computing device 104*a*, 104*b* or may be performed with an interface provided on a user computing device 104*a*, 104*b*, such as a user computing device 104*a*, 104*b* embodied as a mobile phone or tablet computer. The method 700 may include detecting 702 an electronic receipt. Detecting 702 an electronic receipt may include receiving a picture of an electronic receipt displayed on a vending machine POS 106*b* using a camera of a mobile computing device and extracting the electronic receipt according to an optical code protocol. The method 700 may further include decoding 704 the electronic receipt to extract data encoded therein. In some embodiments, the entirety of accessible transaction data may be encoded in the electronic receipt such decoding 704 is sufficient to provide access to the transaction data.

Where the electronic receipt encodes an identifier or other code, this identifier may be extracted and then used to retrieve 706 the transaction data. For example, retrieving 706 transaction data may include transmitting the extracted identifier to a server system 102*b*. The server system 102*b* may then retrieve the transaction data corresponding to the extracted identifier and transmits the transaction data to the user computer 104*a*, 104*b*. In other embodiments, the extracted identifier may be transmitted to a server system 102*a* operated by someone other than the entity operating the POS 106*b*. In such embodiments, the server system 102*a* may retrieve the transaction data corresponding to the extracted identifier from the server system 102*b* corresponding to the POS 106*b*. In some embodiments, the extracted identifier may include sufficient information to enable the server system 102*a* to identify the server system 102*a* from which to request the transaction data. Once retrieved, the transaction data can be stored locally on the requesting user computing device 104*a*, 104*b*. The transaction data may also be displayed 708 on retrieval or at a later time upon request of a user.

Figure 8:
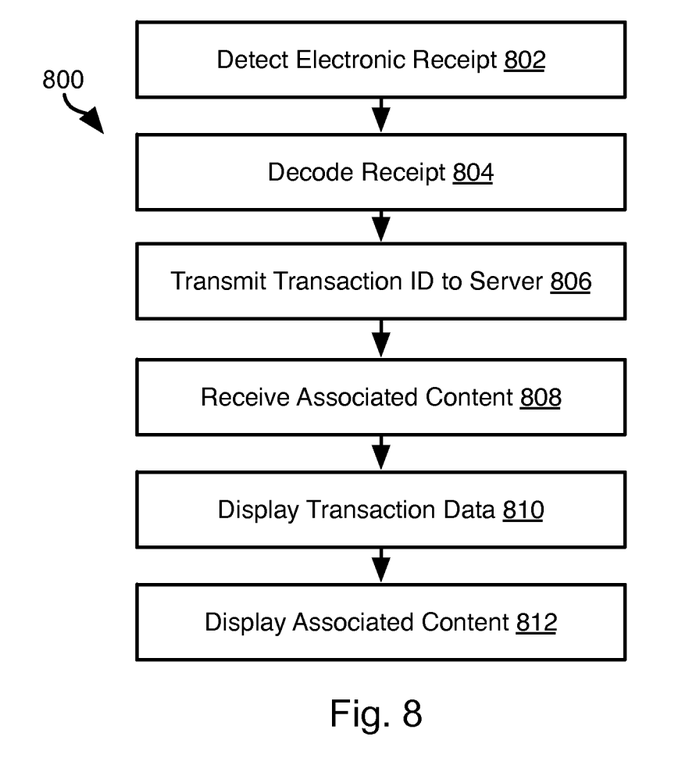
FIG. 8 is a process flow diagram of a method for displaying an electronic receipt generated by a vending machine on a user device in accordance with an embodiment of the invention.

FIG. 8 illustrates a method 800 that may be performed by a user computing device 104*a*, 104*b* or performed elsewhere with an interface provided on the user computing device 104*a*, 104*b*. The method 800 may include detecting 802 an electronic receipt and decoding 804 the electronic receipt in the same manner as described with respect to FIG. 7.

The method 800 may include transmitting 806 a transaction identifier, obtained from decoding 804 the electronic receipt, to a server, such as a server system 102*a* or server system 102*b*. In response to the request, one or both of transaction data corresponding to the transaction identifier and associated content may be received 808. The associated content may include advertisements, offers, product recommendations, or any other data that may be relevant to a transaction. The method 800 may include displaying 810 the transaction data and displaying 812 the associated content. The method 800 may be executed in instances where transaction data is also available on the user computing device 104*a*, 104*b* performing the method 800. In such embodiments, the method 800 may be used upon display of this information in order to retrieve associated content for enriching display of the transaction data.

Figure 9:
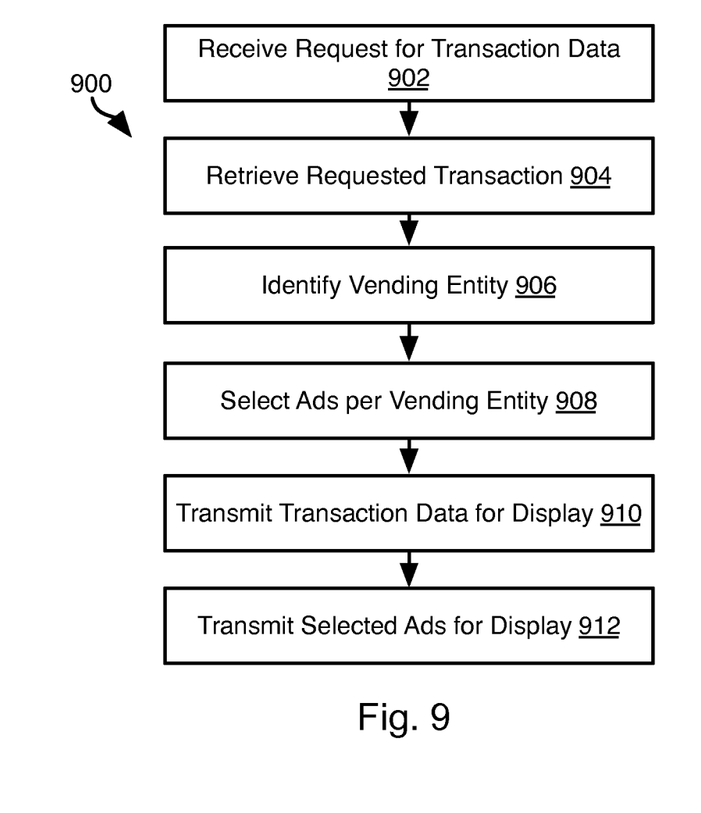
FIG. 9 is a process flow diagram of an alternative method for accessing an electronic receipt generated by a vending machine in accordance with an embodiment of the invention.

FIG. 9 illustrates a method 900 that may be executed by a server system 102*a* that is not the entity that operates or controls a vending machine POS 106*b*. Alternatively, the method 900 may be executed elsewhere with an interface provided to the server system 102*b*. The method 900 may be invoked upon receiving a request for transaction data from a user computing device 104*a*, 104*b*.

The method 900 may include receiving a request 902 for transaction data, such as from a user computing device 104*a*, 104*b*. The request may include a transaction identifier. Transaction data corresponding the transaction identifier may then be retrieved 904. Where the transaction identifier corresponds to a transaction conducted on a vending machine POS 106*b* owned or controlled by a different entity, retrieving 904 may include requesting this information from a server system 102*b* corresponding to the vending machine 106*b*. The request may include the transaction identifier. The transaction data returned by the server system 102*b* to the server system 102*a*. In some embodiments, the server system may store transaction data received from the server system 102*b* on a user's behalf in a user account associated with the user.

The method 900 may include identifying 906 a vending entity, either from the transaction identifier itself or the received transaction data, or some other means. Advertisements may then be selected 908 corresponding to the identified 906 vending entity. This may include requesting an advertisement from the vending entity in response to the received 902 request and receiving one or more advertisements in response. Selection 908 may additionally or alternative include selecting one or more advertisements corresponding to the identified vending entity from a collection of advertisements already stored or accessible by the server system 102a.

The method 900 may then include one or both of transmitting 910 the requested transaction data and transmitting 912 the selected advertisements. Upon receipt of one or both of the transaction data and selected advertisements, these may be displayed on the requesting user computing device 104a, 104b.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A vending machine system comprising:
   a vending machine comprising:
      a product receptacle storing a plurality of products;
      a dispensing system selectively engaging the plurality of products;
      a product selection interface;
      a payment receiving device; and
      a display device; and
   a server operably coupled to the vending machine, the server including a database, the database including a plurality of transaction records and a controller, the controller being programmed to:
      receive a product selection from the product selection interface;
      receive a notification of receipt of payment from the payment receiving device;
      activate, after the notification of receipt has been received, the dispensing system to dispense a dispensed product of the plurality of products corresponding to the product selection;
      store a transaction record within the database including an identity of the dispensed product, when the dispensed product was sold by the vending machine, and an amount paid for the dispensed product at the vending machine;
      after the notification of receipt has been received, begin displaying on the display device an optical code encoding a URL that, when accessed, retrieves a web page identifying the dispensed product, when the dispensed product was sold by the vending machine, and the amount paid for the dispensed product at the vending machine from the transaction record within the database; and
      stop displaying the optical code upon a determination that a customer has departed from the vending machine.

2. The vending machine system of claim 1, wherein the vending machine system further comprises at least one environmental sensor operably coupled to the controller; and
   wherein the controller is further programmed to:
      detect the departure of the customer from proximate the vending machine according to an output of the at least one environmental sensor; and
      stop displaying the optical code in response to detecting the departure of the customer.

3. The vending machine system of claim 2, wherein the at least one environmental sensor is a camera.

4. The vending machine system of claim 2, wherein the at least one environmental sensor is a thermal sensor.

5. The vending machine system of claim 2, wherein the at least one environmental sensor is a microphone.

6. The vending machine system of claim 1, wherein the controller is further configured to display on the display device the optical code identifying a transaction for sale of the dispensed product and further comprises invoking display of a two dimensional bar code.

7. The vending machine system of claim 1, the controller further configured to generate advertisements corresponding to a provider of the vending machine with the transaction record.

8. A method of utilizing a vending machine system that includes a vending machine including a product receptacle storing a plurality of products, a dispensing system selectively engaging the plurality of products, a product selection interface, a payment receiving device, and a display device, and a server coupled to the vending machine, the server including a plurality of user accounts and a plurality of transaction records and a controller, the method comprising:
   receiving a product selection from the product selection interface;
   receiving a notification of receipt of payment from the payment receiving device;
   activating, after the notification of receipt has been received, the dispensing system to dispense a dispensed product of the plurality of products corresponding to the product selection;
   storing a transaction record within a database including an identity of the dispensed product, when the dispensed product was sold by the vending machine, and an amount paid for the dispensed product at the vending machine;
   after the notification of receipt has been received, begin displaying on the display device an optical code encoding a URL that, when accessed, retrieves a web page identifying the dispensed product, when the dispensed product sold by the vending machine and the amount paid for the dispensed product at the vending machine from the transaction record within the database; and
   stop displaying the optical code upon a determination that a customer has departed from the vending machine.

9. The method of claim 8, further comprising, receiving, through the web page, advertisements corresponding to a provider of the vending machine with the transaction record.

10. The method of claim 8, wherein the optical code is a two dimensional bar code.

11. The method of claim 8, wherein the vending machine system further comprises at least one environmental sensor operably coupled to the controller, the method further comprising steps of:
    detecting the departure of the customer from proximate the vending machine according to an output of the at least one environmental sensor; and
    stopping display of the optical code in response to detecting the departure of the customer.

12. The method of claim 11, wherein the at least one environmental sensor is a camera.

13. The method of claim 11, wherein the at least one environmental sensor is a thermal sensor.

14. The method of claim 11, wherein the at least one environmental sensor is a microphone.

15. A vending machine system comprising:
    a vending machine comprising:
       a product receptacle storing a plurality of products;
       a dispensing system selectively engaging the plurality of products;
       a product selection interface;

a payment receiving device;
a display device;
at least one environmental sensor; and
a server operably coupled to the vending machine, the server including a database, the database including a plurality of transaction records and a controller, the controller being programmed to:
receive a product selection from the product selection interface;
receive a notification of receipt of payment from the payment receiving device;
activate, after the notification of receipt has been received, the dispensing system to dispense a dispensed product of the plurality of products corresponding to the product selection;
store a transaction record within the database including an identity of the dispensed product, when the dispensed product was sold by the vending machine, and an amount paid for the dispensed product at the vending machine;
after the notification of receipt has been received, begin displaying on the display device an optical code encoding a URL that, when accessed, retrieves a web page identifying the dispensed product, when the dispensed product was sold by the vending machine, the amount paid for the dispensed product, and advertisements corresponding to a provider of the vending machine at the vending machine from the transaction record within the database; and
detect departure of a customer from proximate the vending machine according to an output of the at least one environmental sensor; and
end display on the display device of the optical code in response to detecting the departure of the customer.

* * * * *